United States Patent
Bain et al.

[15] 3,692,992
[45] Sept. 19, 1972

[54] LAMP AND SWITCH ASSEMBLY FOR THE REAR COMPARTMENT OF A MOTOR VEHICLE

[72] Inventors: Douglas G. Bain, Rochester; James J. Hartmeyer, St. Clair Shores, both of Mich.

[73] Assignee: General Motors Corporation, Detroit, Mich.

[22] Filed: Oct. 19, 1970

[21] Appl. No.: 81,807

[52] U.S. Cl. ................... 240/2, 200/61.62, 240/2.25
[51] Int. Cl. ............................................. F21v 33/00
[58] Field of Search ............ 240/2, 7.1, 7.25, DIG. 4; 200/61.62, 61.76, 61.81, 61.82

[56] References Cited

UNITED STATES PATENTS

| | | | |
|---|---|---|---|
| 3,193,673 | 7/1965 | Herring | 240/7.1 |
| 3,576,409 | 4/1971 | Fiddler | 200/61.62 |

*Primary Examiner*—Louis J. Capozi
*Attorney*—J. L. Carpenter, E. J. Biskup and P. D. Sachtjen

[57] ABSTRACT

A lamp and switch assembly for the rear compartment of a motor vehicle wherein a one piece electrically conductive mounting and switching bracket includes a pair of juxtaposed L-shaped sections interconnected by an integral stress loop, one of the sections being snapped onto the compartment periphery in grounding relationship therewith and the other section engaging the compartment lid and being pivotable with respect to the fixed section by elastic yielding and stressing of the loop. A lamp housing including a lamp bulb is mounted on the pivoting section and carries a grounding contact which is resiliently biased against the fixed section to complete an electrical circuit between the lamp bulb and the grounded vehicle body when the lid is open. When the trunk lid is closed, the grounding contact and the pivoting section are carried away from electrical contact with the fixed section to open the electrical circuit or extinguish the light bulb.

3 Claims, 6 Drawing Figures

PATENTED SEP 19 1972

INVENTORS
Douglas G. Bain &
BY James J. Hartmeyer

Peter D. Sachtjen
ATTORNEY

INVENTORS
Douglas G. Bain &
BY James J. Hartmeyer

Peter D. Saeltjen
ATTORNEY

LAMP AND SWITCH ASSEMBLY FOR THE REAR COMPARTMENT OF A MOTOR VEHICLE

The present invention relates to lamp and switch assemblies for illuminating enclosures and, in particular, to a lamp and switch assembly for illuminating the rear compartment in a motor vehicle upon opening movement of the compartment lid.

At the present time, the rear compartments or trunks in motor vehicles are provided with a lamp assembly for illuminating the trunk enclosure upon opening movement of the trunk lid and for automatically extinguishing the light source as the trunk lid is moved toward a closed position. Generally, these lamp assemblies comprise a combination lamp and switch having reciprocal or pivotal members which are selectively shifted in accordance to movement of the trunk lid to complete or interrupt a circuit to a lamp bulb.

One type of trunk lighting device uses a switch having a spring biased reciprocal plunger which is mounted in close proximity of the trunk lid or trunk hinge arm. When the trunk lid is open or closed the plunger is appropriately shifted to illuminate and extinguish the lamp bulb. Another type of device uses a pivoting lever arm which engages the movable trunk hinge arm to make or break a circuit to the bulb. In each of the above arrangements, the number of components to provide this switching movement increases the complexity of the device while the shifting and rotating parts increase the probability of frictional wear and cyclic failure. Additionally, such units generally require an accurate mounting arrangement, usually by adaptor brackets, to ensure actuation for switch. To avoid the problems associated with mechanical actuation, the rear compartments have been provided with a mercury switch mounted on the trunk lid that completes a circuit to the light source where the trunk lid is in the raised position. However, this arrangement is quite costly and, by remotely placing the lamp on the lid, the overall illumination in the compartment is reduced.

The present invention contemplates a simplified rear compartment lamp and switch assembly which is conveniently operatively snapped into place in the rear compartment, contains no moving parts subject to frictional wear, and provides positive and reliable actuation upon closure movement of the trunk lid with a minimum amount of preliminary alignment. More particularly, the lamp assembly comprises just two basic parts, a one piece electrically conductive mounting and switching bracket and a lamp housing which carries and shields the light bulb. The bracket includes a pair of parallel spaced, juxtaposed L-shaped sections which are integrally connected by a stressable loop. One of the sections includes a retaining clip which conveniently snaps onto the compartment periphery to establish a threefold result; an electrical ground connection, an inherently aligned position for actuation, and a resiliently clamped mounting for the unit. The lamp housing is formed of an insulating material and is mounted on one leg of the pivoting section while a vertical leg thereof is aligned and engageable with the trunk lid upon closing movement of the latter. A grounding contact between the lamp bulb and the mounting section is biased by the internal stresses within the loop into engagement with the latter to complete an electrical circuit between the vehicle battery and the grounded vehicle body when the trunk lid is in an open position. Upon closing movement of the trunk lid, the movable section is pivoted downwardly by elastic yielding of the stress loop to break contact between the ground and the fixed section thereby extinguishing the light bulb. With this arrangement, it will be appreciated that all movable parts subject to frictional wear are eliminated thereby prolonging the life of the unit. Additionally, the switch is easily mounted in a fixed relationship to the trunk enclosure thereby providing a constant illumination field and improved lighting for the trunk compartment.

These and other features of the present invention will be apparent to one skilled in the art upon reading the following detailed description, reference being made to the accompanying drawings in which.

Figure 1:
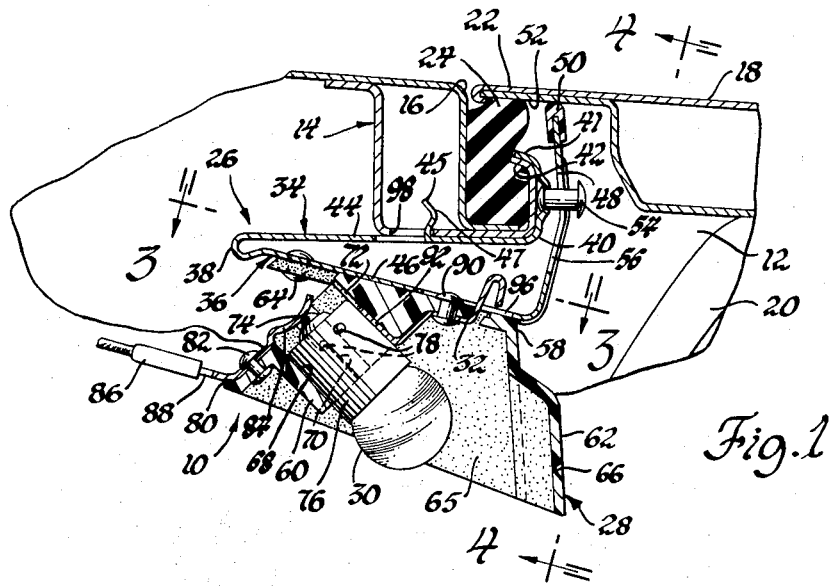
FIG. 1 is a cross sectional view of a lamp and switch assembly made in accordance with the present invention mounted in the rear compartment of a motor vehicle with the trunk lid in the closed position and the lamp extinguished.
Figure 2:
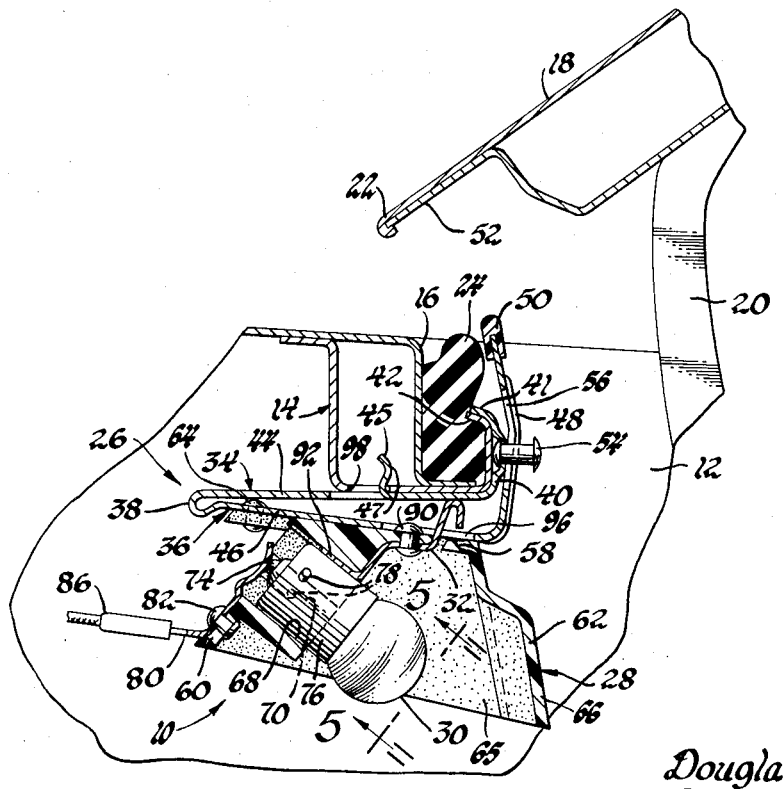
FIG. 2 is a view similar to FIG. 1 showing the lamp and switch assembly with the trunk lid in the raised position and the lamp illuminated.
Figure 3:
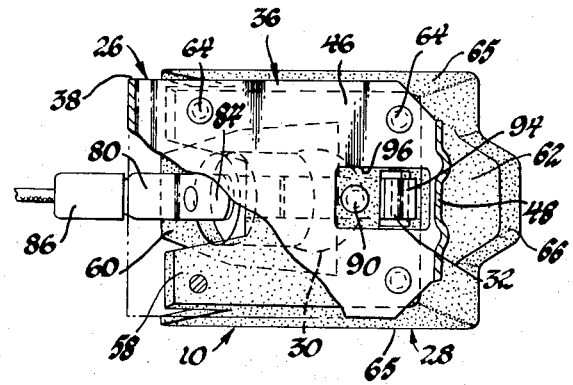
Figure 5:
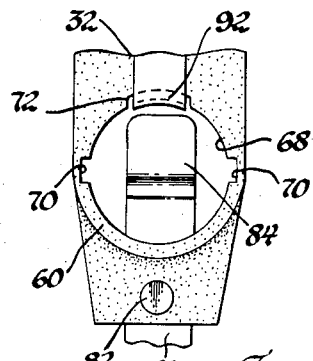
Figure 4:
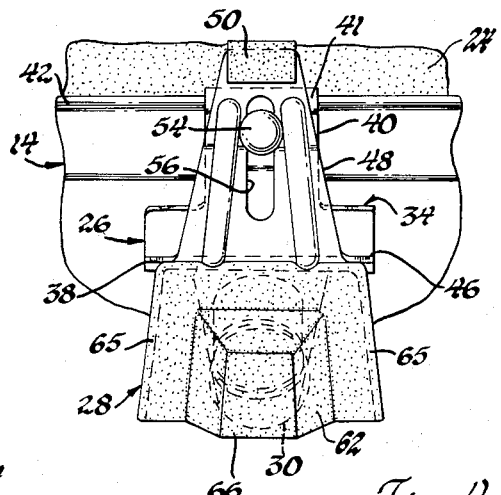
Figure 6:
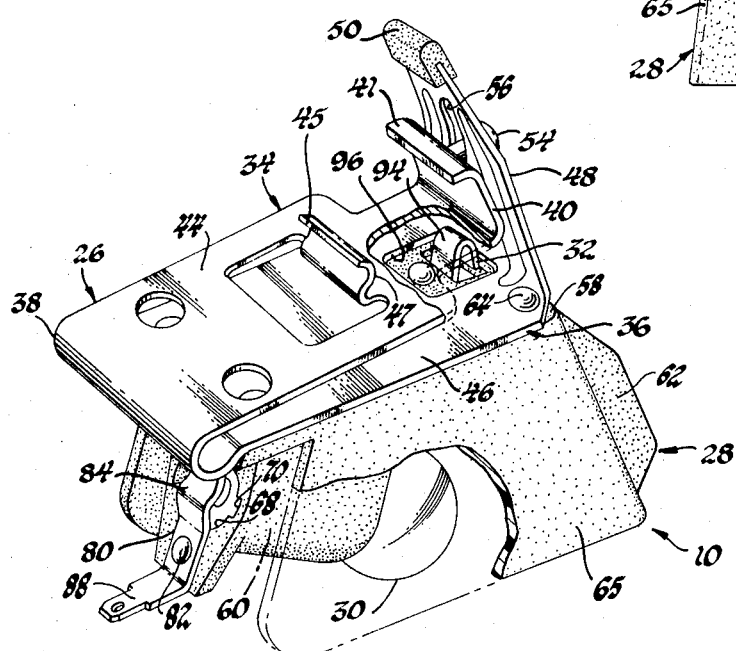

FIG. 3 is a view taken along line 3—3 of FIG. 1;
FIG. 4 is a view taken along line 4—4 of FIG. 1;
FIG. 5 is a view taken along line 5—5 of FIG. 2; and
FIG. 6 is an enlarged partially sectioned perspective view of the subject lamp and switch assembly.

Referring to FIG. 1 and 2, there is shown a combination lamp and switch assembly 10 for illuminating a trunk enclosure or a rear compartment 12 of a motor vehicle. The lamp and switch assembly 10 is mounted within the compartment 12 on a peripheral channel 14 which defines an access opening 16 for the enclosure. A trunk lid 18 is mounted with respect to the channel 14 by a hinge arm 20 for upward pivotal movement about a transverse axis with respect to the opening 16 between the closed position of FIG. 1 and the raised position of FIG. 2. In the closed position, the outer rim 22 of the trunk lid 18 sealingly engages a gasket 24 retained adjacent the inner lip of the channel 14 to establish a seal for the compartment 12. As is conventional, the assembly 10 is extinguished when the trunk lid 18 is in the closed position and illuminated when the trunk lid 18 is in the open position.

More specifically, the lamp and switch assembly 10 generally comprises a unitary mounting and switching bracket 26 and a lamp housing 28 carrying a light bulb 30 and a grounding contact 32. The bracket 26 is formed from an electrically conductive metallic strip such as spring steel and includes a pair of parallel spaced juxtaposed L-shaped bracket sections 34 and 36 integrally connected by a U-shaped reversely bent stressable loop 38. The upper bracket section 34 constitutes the fixed mounting member of the bracket 26 and includes a vertical arm 40 having a forwardly turned lip 41 which is hooked over an upper rim 42 on the channel 14. The horizontal arm 44 of the section 34 is formed with an intermediate upwardly extending yieldable clip 45 having a curved rib 47. With the lip 41 hooked over rim 42, the clip 45 is pivoted upwardly with the rib 47 detenting over the edge of an opening 98 formed in a lower surface of the channel 16. In this position, the bracket 26 will be operatively aligned and establish a grounding contact with the vehicle body.

The lower section 36 of the bracket 26 constitutes the actuating and switching member and includes a horizontal switching arm 46 extending rearwardly from the stress loop 38 and terminating with an upwardly extending actuating arm 48. A protective plastic cap 50 is retained at the upper end of the arm 48 and serves as a bumper which is engageable with the inner surface 52 of the outer rim 22 of the lid 18. Upon closure movement of the trunk lid 18, the inner surface 52 engages the cap 50 thereby downwardly pivoting switching arm 46 relative to the upper bracket section 34 by elastically deforming the stress loop 38. With this arrangement, it will be noted that the internal stresses in the loop 38 serve to bias the sections 34 and 36 to a normally closed position for illuminating the light bulb 30 as hereinafter described.

As shown in FIG. 4, the bracket 26 is provided with stress limiting means in the form of a pin 54 retained on the leg 40 and registering in an elongated vertical slot 56 formed in the actuating arm 48. The confines of the slot 56 determine the maximum stress position or spreading of the sections 34 and 36 and accordingly prevent permanent deformation of the stress loop 38 thereby ensuring a continuous positive biasing to the closed position. The projection of the contact 32 above the switching arm 46 establishes a minimum stress level to ensure positive grounding connection when the trunk lid is in the raised position.

The lamp housing 28 is in the form of a one-piece molding of an electrically insulating material such as nylon. The housing 28 includes a base section 58, a bulb holding socket 60, and a peripheral shade 62. The base 58 is generally rectangular and fixedly clamped at its corners to the switching arm 46 by rivets 64. The shade 62 has downwardly extending side walls 65 and rear wall 66 formed at the sides of the base 58. The walls 65 and 66 serve to downwardly direct illumination from the light bulb 30 as well as provide the latter with a protective enclosure against damage. The socket 60, as shown in FIGS. 2 and 5, is provided with a slightly downwardly and rearwardly inclined cylindrical cavity 68. A pair of J-shaped bayonet slots 70 are formed in diametrically opposed relationship at the side walls of the cavity 68. A grounding contact groove 72 is formed at the upper wall of the cavity 68.

The light bulb 30 is of a conventional type being provided with a central terminal pin 74 and a cylindrical metallic grounding sleeve 76. The pin 74 is connected to one filament lead while the sleeve 76 is connected to the other filament lead for completing current through the bulb filament. The grounding sleeve 76 is provided with bayonet pins 78 which are slidably receivable in the slots 70 and rotatable therewithin to lock the bulb 30 in the socket 60.

A generally L-shaped input terminal 80 is attached to the front surface of the bulb socket 60 by a rivet 82. The terminal 80 has an upwardly extending finger 84 at the forward end of the socket 68 that engages the terminal pin 74. An electrical connector 86 is clamped onto the front end 88 of the terminal 80. The connector 86 is wired to suitable power supply such as the vehicle battery.

The grounding contact 32 has a central section fixedly connected to the base 58 by a rivet 90. The contact 32 includes a first end 92 extending along the cavity 68 within the groove 72 and electrically engaging the outer surface of the sleeve 76. The other end of the contact 32 is in the form of a U-shaped lip 94 which extends through an opening 96 formed on the arm 46 and projects a predetermined distance thereabove. Accordingly, this projection establishes an initial biasing between the sections 34, 36 to establish a ground connection at the aforementioned minimum stress level when the trunk lid 18 is in the raised position.

In operation, an electrical circuit is completed to the lamp filament through the terminal 74 and grounding sleeve 76 to illuminate the bulb 30 and the compartment 12 when the ground connection is established upon opening movement of the trunk lid 18. As the trunk lid 18 is pivoted downwardly to the closed position, the inner surface 52 engages the cap 50 to cause spreading pivotal movement of the bracket sections 34, 36 about the stress loop 38. This movement causes the loop 38 to elastically yield with the tip 94 breaking contact with the arm 44 thereby interrupting the electrical circuit to the bulb 30 and extinguishing the filament.

With the above arrangement, it will be noted that the lamp assembly 10 can be readily clamped onto the trunk gutter without the need for special adaptive brackets. At the time same time, the switch mechanism will be inherently accurately located for actuation by the trunk lid 18. These features together with the elimination of any moving parts provide an assembly which evidences little wear even after extended periods of cycling.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A lamp and a switch assembly for illuminating an enclosure having an opening closable by a movable member pivotable between an open position and closed position comprising: a one piece electrically conductive mounting member having a pair of juxtaposed sections interconnected by an integral stress loop, one of the sections being mounted within the enclosure in electrical grounding relation therewith, the other of the sections being engageable with the movable member upon movement of the latter to said closed position to effect a relative opening pivotal movement between said sections by increasingly stressing said loop; means adapted to carry a light source on one of the sections; means for electrically connecting said light source to an electrical source; and grounding contact means connected to said light source and engaging said mounting member when said movable member is in said open position for establishing a ground connection for said light source thereby energizing the latter, said grounding contact means separating from the mounting member upon pivoting of said movable member to said closed position to interrupt said ground connection and extinguish said light source.

2. A lamp and switch assembly for illuminating a compartment of a motor vehicle, said compartment having a peripheral member defining an opening and a lid hingedly movable with respect to the opening between an open position and a closed position, said lamp and switch assembly comprising: a one piece electrically conductive mounting and switching bracket including first and second sections integrally connected by a U-shaped stressable loop, said first section including a pair of flexible clipping arms yieldingly engageable with the peripheral member to resiliently clamp said bracket thereon in ground relationship thereto, said second section being engageable with the lid upon movement of the lid to the closed position to cause opening pivotal movement between the sections about said stressable loop; a bulb holding means on said second section adapted to carry a light source; terminal means adapted to be connected to an electrical source for establishing a circuit to said light source; and a grounding contact having one end electrically contacting said light source and the other end projecting through said second section and electrically contacting said first section when the lid is in the open position to establish a resilient ground connection to the peripheral member to thereby illuminate said light source, said grounding contact separating from said first section upon movement of the lid to said closed position thereby breaking the ground contact and extinguishing said light source.

3. In a motor vehicle, a combination lamp and switch assembly for illuminating a vehicle trunk, said trunk including a peripheral channel defining an opening and having a trunk lid hingedly movable with respect to the opening between an open position and a closed position, said combination lamp and switch assembly comprising: a one piece metallic mounting and switching bracket including a pair of generally parallel L-shaped sections; an integral stressable U-shaped loop resiliently interconnecting the sections; a pair of flexible clipping arms on one of the sections yieldingly engageable with the channel to resiliently clamp said bracket thereon in grounding relation therewith; a projecting leg on the other of said sections engageable with the lid to cause opening pivotal movement of the sections about said loop upon movement of the trunk lid to the closed position; bulb holding means on said other of said sections adapted to carry a light bulb; stop means between the sections for limiting the maximum stress level in the loop; a grounding contact having a first end and a second end, said first end electrically contacting said light bulb, said second end projecting through said other of said sections and normally engaging said one of said sections so as to cause a predetermined pivoting and initial biasing between said sections and establish a minimum stress level in the loop thereby ensuring a resilient ground contact and completing a grounding circuit to the peripheral channel when the lid is in the open position; and a terminal on the housing engaging said bulb adapted to be connected to an electrical sources for establishing a circuit through said bulb to the channel whereby closing movement of the lid engages said projecting leg to cause said opening pivotal movement to break the ground contact and extinguish the bulb, and, opening movement of the lid permits unstressing of the loop to cause closing pivotal movement to reestablish the grounding circuit and illuminate the bulb.

* * * * *